United States Patent [19]

Chrisman

[11] 4,240,847

[45] Dec. 23, 1980

[54] PRODUCTION OF PLATINUM GROUP METAL LAYER ON A REFRACTORY

[75] Inventor: Max G. Chrisman, Granville, Ohio

[73] Assignee: Owens-Corning Fiberglas Corporation, Toledo, Ohio

[21] Appl. No.: 954,049

[22] Filed: Oct. 23, 1978

Related U.S. Application Data

[62] Division of Ser. No. 862,996, Dec. 21, 1977, abandoned.

[51] Int. Cl.$^3$ .............................................. B05D 3/02
[52] U.S. Cl. .................................. 156/62.2; 427/190; 427/376.7; 427/376.8; 428/434; 427/191; 427/192
[58] Field of Search ............... 156/62.2; 427/191, 190, 427/192, 376 G, 376 E, 376 H

[56] References Cited

U.S. PATENT DOCUMENTS

| | | | |
|---|---|---|---|
| 2,777,254 | 1/1957 | Siefert et al. .............................. 49/81 |
| 2,799,600 | 7/1957 | Scott ..................................... 427/375 |
| 3,497,384 | 2/1970 | Pirigyi ............................. 427/191 X |
| 3,503,118 | 3/1970 | Criscione et al. ................. 427/191 X |
| 3,598,635 | 8/1971 | Sagona .............................. 427/191 X |
| 4,059,541 | 11/1977 | Petrow et al. .................... 282/313 R |

OTHER PUBLICATIONS

"Refining of Platinum and Rhodium by Ion Exchange Process", Butler, Industrial and Engineering Chemistry, vol. 48, No. 4. Apr. 1956, pp. 711–713.

*Primary Examiner*—George F. Lesmes
*Assistant Examiner*—E. Rollins Buffalow
*Attorney, Agent, or Firm*—Ronald C. Hudgens; Charles F. Schroeder; Robert F. Rywalski

[57] ABSTRACT

There is provided a process, and the product resulting therefrom, for coating a refractory block or substrate with a small particle size form of at least one platinum group metal whereby a fused layer of such metal is formed on the refractory and is directly and strongly adhered on a surface thereof. This technique can likewise be employed in such a manner that the layer is a bonding agent for purposes of bonding a separate sheet of a platinum group metal to the refractory which structure can then be employed as a glass contacting member in apparatus for handling molten glass.

2 Claims, No Drawings

PRODUCTION OF PLATINUM GROUP METAL LAYER ON A REFRACTORY

This is a division, of application Ser. No. 862996, filed Dec. 21, 1977, now abandoned.

THE INVENTION

The present invention relates to methods for forming laminated structures and even yet more particularly relates to a method for forming a thin, fused layer consisting essentially of at least one platinum group metal on a refractory substrate. According to a further feature of the present invention, the method can be employed to produce a glass contacting member which can be employed in glass handling apparatus.

There are many instances in the glass manufacturing industry wherein refractory structures are employed which carry an outwardly disposed layer or sheet consisting essentially of at least one platinum group metal. As exemplified in U.S. Pat. No. 2,777,254, which is hereby incorporated by reference, such articles can be employed as the feeder, or bushing, for producing fibrous glass products or they may be employed as a glass contacting part of the wall structure of a glass melting tank. In addition to such uses, such structures may be employed as skimmer blocks in glass furnaces and they may likewise be employed as electrodes in electric melt furnaces. Additionally, in many instances it is required, for example for quality control purposes, to monitor the electrical conductivity of refractory structures. In the latter instance, of course, the refractory must be provided with opposed electrodes to allow such measurements.

According to the present invention, applicant provides for a simple reliable method for forming a thin, fused layer consisting essentially of at least one platinum group metal directly and strongly adhered on the surface of a refractory substrate. This method may be used to produce articles which may, in turn, be employed for the previously indicated purposes; when, for example, a thicker more durable layer of the platinum group metal is desired the method may be employed to bond a platinum group sheet metal to the refractory structure.

Thus, in accordance with this invention, a process is provided for forming a thin fused layer consisting essentially of at least one platinum group metal directly and strongly adhered on the surface of a refractory substrate which comprises: depositing a solid, small particle size form of the metal in a thin layer on the refractory substrate and heating the layer at a temperature and for a time sufficient to fuse the deposited layer into a thin, fused, uniform layer; the solid small particle size form of the metal is produced by a process which comprises substantially quantitatively reducing a complex of the metal in an aqueous solution and precipitating the elemental form of the metal therefrom as a solid small particle size form of the metal and then drying the precipitated metal under conditions of temperature and time so as to avoid sintering the particles. Suitably, the complex will be a halide, for example chloride, or nitrite complex. Quite outstanding results will be obtained when the metal is an alloy of platinum and rhodium wherein the platinum desirably will be in a major (greater than 50% by weight) amount and the rhodium will be present in a minor amount. Outstanding results will be obtained by using an alloy consisting essentially of about 70 to 80 weight percent platinum and about 20 to 30 percent rhodium. Desirably, the reducing and precipitating step will comprise adding hydrazine or a hydrazine hydrate to an aqueous solution of nitrate or halide complexes of platinum and rhodium and precipitating platinum and rhodium under alkaline conditions.

According to a further feature of this invention, prior to heating the deposited layer to fusion, a sheet consisting essentially of a platinum group metal or an alloy of platinum group metals is positioned on the particulate mass and the heating is effected so as to bond the sheet to the refractory. Such a structure may be employed as a glass contacing member in conventional glass handling apparatus such as alluded to above.

Desirably, the small particle size platinum group material will be a purified alloy of platinum and rhodium which is a product of reclamation and is produced by a process which comprises: (a) dissolving a platinum-rhodium alloy which is contaminated with metals or metallic compounds in aqua regia; (b) adding sodium chloride to the solution in an amount of between about 70%–100% of the stoichiometric amount required to form disodium chloroplatinate and trisodium chlororhodate; (c) evaporating the solution of step b for a time sufficient to destroy nitric acid and until hydrogen chloride fumes are substantially no longer detectable; (d) contacting an aqueous solution of the product of step c with a sodium form cation exchange resin to separate contaminate metal cations and provide an effluent containing reducible platinum and rhodium anionic complexes in an aqueous solution (e) reducing the complexes to elemental platinum and rhodium with a strong reducing agent and precipitating the small particle size alloy. Advantageously, prior to step e residual contaminates are removed by precipitating the residuals under alkaline conditions and separating them by filtration. If ultra-high purity material is desired, subsequent to step "e" and prior to drying of the small particle size form alloy, contaminates are further removed from the precipitate by treating the precipitate with an aqueous solution containing effective sequestering amounts of a sequestering agent and separating the treated precipitate. Quite suitable results will be obtained when employing ethylenediamine tetraacetic acid or its alkali, for example sodium, metal salts.

The small particle size platinum group metals which are employed herein are not, per se, new. In fact, they have been produced for many years but to applicant's knowledge, no one has recognized the beneficial attributes of such small particle size platinum group metals or alloys. As is well known in the art, bushings, or glass feeders, employed in the production of fibrous glass products are manufactured from sheets of at least one platinum group metal and, more typically, alloys thereof. In the process of manufacturing such bushings, the metals and alloys volatilize and condense on adjacent refractory structures. These condensed forms are then collected and initially separated from bulk residual refractory by conventional gravimetric separation techniques to produce a platinum group metal or alloy which is still somewhat contaminated with other metals or metal compounds. The contaminated form of the alloy is then treated by the process indicated above to produce a purified small particle size form of the metal or alloy. Notwithstanding the availability and production of such small particle size material, that material was sintered into masses and melted and then processed into sheets to form bushings. That is, to the best of applicant's knowledge, no one recognized that this material could advantageously be employed in a process for forming a thin, fused layer consisting essentially of at least one platinum group metal onto a refractory substrate. For further particulars on the method for manufacturing the small particle size material contemplated for use herein, referenece may be made to "Refining of Platinum and Rhodium by an Ion Exchange Process" appearing in "Industrial and Engineering Chemistry," April, 1956, page 711 which is hereby incorporated by reference.

The refractories upon which a thin fused layer consisting essentially of at least one platinum group metal, i.e., Pt, Ru, Rh, Pd, Os, Ir or alloys thereof are formed of any of the refractories conventionally employed in the glass manufacturing industry. Such refractories are generally discussed in "Handbook of Glass Manufacture", Volume 1, Section 7, (1974) by Tooley which is hereby incorporated by reference. Preferably, the refractory will have surface porosity, or will have a rough surface so as to allow penetration of the particles into the surface voids. Outstanding results will be obtained using a chromic oxide refractory.

The solid, small particle size form of the platinum group metal or alloy thereof may be deposited onto the refractory substrate in any conventional manner. For example, the material may be applied as a dry powder, as for example, by brushing a layer onto the refractory substrate or employing a doctor blade technique. If desired, these particles may be slurried in a suitable volatile carrier for example, alkanols, ketones, esters, ethers, or the mono and di-alkyl ethers of ethylene glycol, and their derivatives, in which case the slurry may, for example, be applied by flow coating, spraying and the like.

Generally, the small particle form material will be applied in a thickness sufficient that upon fusing the resulting thickness will be in the range of about 0.0005 to about 0.125 inches and preferably, at least for bonding, about 0.0005 to about 0.001. In the embodiment wherein the solid small particle size material is to be employed to bond a sheet of a platinum group metal to the refractory, or a sheet of an alloy of a platinum group metal, such sheet will generally be on the order of at least about 0.003 inch in thickness. Various heating cycles may be employed to effect the fusion and/or bonding but generally the intensity of such cycles are, surprisingly, quite low. For example, the fusion and/or bonding may be effected without any significant pressure, i.e. at atmospheric pressure, at temperatures in the range of about 2000° F. or 2200° F. to about 2700° F. The time for heating of course, will vary with the temperature but even at temperatures between 2200° F. and 2400° F. times on the order of about ½ to about 1 hour will be quite satisfactory. No particular care or any special equipment is required for the fusing and/or bonding step but, of course, in those instances where a volatile carrier is employed that carrier will have to first be evaporated with suitable precautions taken depending on the nature of the material employed.

Thus, as indicated above, the process is quite simple and reliable and, as will be appreciated, can be practiced quite economically. Thus, while evaporative coating techniques are known, for example, as disclosed in U.S. Pat. No. 2,799,600, it will be appreciated that such sophisticated equipment need no longer be employed and coatings can now be produced even in small thicknesses quite conveniently and economically.

While the foregoing sets forth the present invention with sufficient particularity to enable those skilled in the art to make and use same, nonetheless there follows further exemplification of the present invention.

EXAMPLE 1

The solid form small particulate material which was employed was an alloy consisting essentially of about 76-77% by weight platinum and about 23-24% by weight rhodium. This alloy was a purified, reclaimed material produced in accordance with the teachings of the above incorporated article appearing in "Industrial and Engineering Chemistry". The alloy was initially that which condensed on adjacent refractory walls in the bushing manufacturing process and this alloy was intially separated by conventional gravimetric techniques from the bulk of contaminate refractories and that separated alloy, which was still contaminated with metals and metal compounds, was dissolved in aqua regia. A sufficient quantity of solid sodium chloride is added to the solution in an amount of about 70 mole percent of the stoichiometric equivalent required to form disodium chloroplatinate and trisodium chlororhodate. This solution in turn is evaporated to dryness and 3 ml of hydrochloric acid per gram of platinum-rhodium alloy are added. That solution is again evaporated to dryness and the hydrochloric acid treatment is repeated twice with evaporations to destroy the nitric acid. The final evaporation is continued until hydrogen chloride fumes are substantially no longer detectable. The resulting salts are diluted to a concentration of about 25 grams per liter and are heated until all have dissolved. That solution is then pumped through a ion exchange column containing 50 to 100 mesh sodium-form Dowex 50X8 cation exchange resin. The resulting effluent, which contains about 10 grams of the platinum group metals per 400 ml of effluent is then treated by heating about 2.5 liters of the solution containing the platinum and rhodium as anionic complexes to about 65° C. followed by the slow addition thereto of 40 ml of 85% hydrazine hydrate; sodium hydroxide is then added to make the solution distinctly alkaline at which time the platinum group metals are coagulated as a solid, small particle size material. That alloy material may then be filtered and dried and employed as contemplated herein. In a preferred practice however, the supernatant liquid from the substantially quantitative reduction is decanted and the small particle size alloy is washed twice, followed by decantation, with distilled water. The small particle size alloy is then heated for about an hour at 85° C. in a slightly acidic solution of sodium ethylenediamine tetraacetate. The alloy is then washed twice, followed by decantation, and the sequestration is repeated in a solution made slightly alkaline with sodium hydroxide. The small particle size material is then filtered under vacuum and washed with water until the water is substantially chloride-free. Finally, the small particle size alloy is washed with methanol to remove excess water and then air-dried to produce a dry, solid, small particulate size form consisting essentially of platinum and rhodium.

Onto a porous refractory block (for example, a porous chromic oxide such as that manufactured by Corhart Refractories Company under their designation C-1215) the dry solid small particulate alloy is deposited and brushed into a thin layer on the surface thereof. The refractory with its particulate coating is then heated at a temperature of about 2400° F. for about 30 minutes and results in the formation of a strongly adhered, uniform, fused coating consisting essentially of the platinum and rhodium alloy thereon. The thickness of the resulting coating was on the order of about 0.004 inches and it is believed that part of the outstanding adhesion was the result of the material flowing, at least partially, into some of the surface pores of the block.

The following illustrates an embodiment wherein electrodes are bonded to opposite sides of the refractory substrate for purposes of making electrical conductivity measurements. It will be apparent however that only one side of the substrate need be so treated and such products can be employed as bushing materials and/or skimmer blocks and/or wall components of a melting furnace. Onto a sheet (which had been cleaned by washing with methanol or ethanol) of a platinum group metal (alloy of about 76–77% platinum and 23–24% rhodium) a small layer of the above produced powder is brushed into a substantially uniform layer. Onto that powder layer there is then positioned the refractory substrate indicated above and on the exposed surface of the refractory substrate there is then brushed another layer of the dry solid particulate form alloy. Onto that outer layer there is then deposited another sheet of the type used on the opposite side and the entire laminated structure is then heated at a temperature of about 2400° F. for about 30 minutes. The result is a laminated structure in which the externally disposed sheets are strongly bonded to the refractory allowing reliable and accurate conductivity measurements.

While the foregoing describes the present invention, it will of course be apparent that modifications are possible which pursuant to the patent statutes and laws do not depart from the spirit and scope thereof.

I claim:

1. A process comprising heating an article comprised of a particulate layer of a small particle size alloy composition consisting essentially of platinum and rhodium disposed intermediate a refractory substrate and a sheet of platinum group metal or an alloy thereof so as to bond said sheet to said substrate, said small particle size alloy composition being produced by a process which comprises substantially quantitatively reducing platinum and rhodium complexes in an aqueous solution and precipitating the elemental form of said alloy composition therefrom as a solid, small particle size form thereof and drying said precipitate without sinterization.

2. The process of claim 1 wherein said sheet is a sheet of a platinum-rhodium alloy.

* * * * *